(12) United States Patent
Hattori et al.

(10) Patent No.: US 7,059,153 B2
(45) Date of Patent: Jun. 13, 2006

(54) METHOD FOR PRODUCING GLASS POWDERS

(75) Inventors: Koji Hattori, Gamo-gun (JP); Shinsei Okabe, Takatsuki (JP); Toshiyuki Miyoshi, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 284 days.

(21) Appl. No.: 09/867,856

(22) Filed: May 30, 2001

(65) Prior Publication Data

US 2002/0007650 A1    Jan. 24, 2002

(30) Foreign Application Priority Data

Jun. 5, 2000    (JP)    .............................. 2000-167939

(51) Int. Cl.
*C03B 19/10*    (2006.01)
*C03B 19/14*    (2006.01)

(52) U.S. Cl. ........................................ 65/21.1; 65/21.3

(58) Field of Classification Search ............... 131/21.2, 131/21.1, 21.3, 142; 264/15, 55, 45, 45.1; 65/21.2, 21.1, 21.3, 142

See application file for complete search history.

(56) References Cited

U.S. PATENT DOCUMENTS

| | | | |
|---|---|---|---|
| 3,717,486 A * | 2/1973 | Fukumoto et al. ............. 501/80 |
| 4,257,799 A * | 3/1981 | Rosencwaig et al. ......... 65/21.4 |
| 4,340,407 A * | 7/1982 | Anderson et al. ............. 65/21.4 |
| 4,503,158 A * | 3/1985 | Richard ........................ 501/27 |
| 4,560,660 A * | 12/1985 | Geirnaert .................... 435/176 |
| 4,698,317 A * | 10/1987 | Inoue et al. .................... 501/9 |
| 4,871,693 A * | 10/1989 | Inoue et al. .................... 501/9 |
| 5,849,055 A * | 12/1998 | Arai et al. .................... 65/17.3 |
| 6,360,562 B1 * | 3/2002 | Kodas et al. ................. 65/21.1 |
| 2004/0134230 A1 * | 7/2004 | Kodas et al. ................. 65/17.2 |

FOREIGN PATENT DOCUMENTS

| | | |
|---|---|---|
| GB | 2141398 | * 12/1984 |
| JP | 61-256928 | 11/1986 |
| JP | 62-96327 | 5/1987 |
| JP | 2-199033 | 8/1990 |
| JP | 08-091874 | 4/1996 |
| JP | 8-310836 | 11/1996 |

OTHER PUBLICATIONS

Japanese Examination Reported issued Nov. 16, 2004 (w/English translation of relevant portions).

* cited by examiner

*Primary Examiner*—Carlos Lopez
(74) *Attorney, Agent, or Firm*—Dickstein, Shapiro, Morin & Oshinsky, LLP.

(57) ABSTRACT

A powder of solid and spherical glass particles is easily manufactured by subjecting a mixed solution of a raw material oxide powder comprising a glass network-forming element, and an aqueous solution of a water-soluble compound comprising a glass-forming element other than the element of the raw material oxide powder to spray-thermal decomposition, wherein the spray-thermal decomposition temperature is set to be in a specific range according to the amount of the raw material oxide powder in the total of the amount of the raw material oxide powder and the oxide-converted amount of the water-soluble compound, as well as the average particle size of the glass powder to be manufactured.

12 Claims, No Drawings

METHOD FOR PRODUCING GLASS POWDERS

BACKGROUND OF THE INVENTION

1. Field of the Invention

The present invention relates to a powder of spherical glass particles and a method for manufacturing the powder.

2. Description of the Related Art

Conventionally, the most popular method for manufacturing a glass powder is a melting-quenching-crushing method. That is, the main raw materials (silicon oxide, alumina, alkali metal compounds, etc.) constituting a glass, and auxiliary raw materials affecting the melting point and physical properties (crystallization temperature, coefficient of thermal expansion, dielectric constant, etc.) of the glass, are both fed into a vessel such as a platinum crucible, are heated and melted in a melting furnace at a temperature 200 to 300° C. higher than the melting point of the glass (a temperature at which the viscosity of the glass is not more than $10^3$ to $10^4$ dPa/sec) so as to become fully homogeneous and clarified, and then are poured into water to be quenched for vitrification. Then, a glass powder is formed by crushing the glass.

Since the glass powder according to the conventional method is formed by mechanical pulverizing, the obtained powder particles have indeterminate shapes. When such a glass powder is used, for example, for manufacturing a laminate comprising an electroconductive layer and a non-conductive layer (particularly a laminate having a thin electroconductive layer), there will occur some problems. For example, sharp edges of the indeterminate glass particles would break through the electroconductive layer. Also, there are other problems regarding a molded article using a powder of indeterminate glass particles in that the glass particles tend to cause voids in the article and the density of the article tends to drop.

In comparison, spray-pyrolsis method for manufacturing a powder of spherical glass particles which avoids such problems is disclosed in Japanese Unexamined Patent Application Publication No. 8-91874. It teaches that spray-pyrolsis method in which a thermal decomposition reaction of the sprayed droplets is caused by radiant heat, provides hollow glass particles, while spray-pyrolsis method in which droplets are sprayed into a flame environment, provides a powder of solid spherical glass particles.

When the sprayed droplets are thermally decomposed by the radiant heat, the temperatures of the droplets themselves are raised. However, the carrier gas is hard to heat by the radiant heat, and therefore the gas temperature is not raised greatly. Accordingly, the gas flow which is taken out from the spray-thermal decomposition furnace and which contains glass melts (precursors) can be easily cooled. This method has an advantage that a wide compositional range of raw materials is applicable for vitrification although the glass produced is hollow.

When the sprayed droplets are subjected to a thermal decomposition reaction in a flame environment, the carrier gas itself is heated to a very high temperature by the burning. Thus, it is necessary to dilute the high-temperature carrier gas with quite a large amount of a low-temperature gas in order to rapidly cool the gas, and therefore it is difficult to rapidly cool the glass melts contained in the carrier gas. Accordingly, there is a problem of a limited compositional range of raw materials allowed for vitrification.

SUMMARY OF THE INVENTION

Accordingly, it is an object of the present invention to solve the problems described above and to provide a method for manufacturing a powder of solid (that is, not hollow) spherical glass particles easily. It is another object of the present invention to provide a powder of solid (that is, not hollow) spherical glass particles.

For achieving the above-described objects, one aspect of the present invention is a method for manufacturing a glass powder by thermally treating according to spray-pyrolsis method, a mixed solution of a raw material oxide powder comprising a glass network-forming element and an aqueous solution of a water-soluble compound comprising a glass-forming element other than the above-described element of the raw material oxide powder, wherein the amount of the above-described raw material oxide powder is less than about 45% by weight based on the total of the amount of the above-described raw material oxide powder and the oxide-converted amount of the above-described water-soluble compound; the spray-thermal decomposition temperature is set to be not less than the melting point of the glass powder to be manufactured plus about 50° C. when the raw material oxide powder used has an average particle size which is not more than about 1/5 and more than about 1/25 of the average particle size of the glass powder; and the spray-thermal decomposition temperature is set to be not less than the melting point of the glass powder to be manufactured plus about 20° C. when the raw material oxide powder used has an average particle size which is not more than about 1/25 of the average particle size of the glass powder.

Another aspect of the present invention is a method for manufacturing a glass powder by thermally treating according to spray-pyrolsis method, a mixed solution of a raw material oxide powder comprising a glass network-forming element, and an aqueous solution of a water-soluble compound comprising a glass-forming element other than the above-described element of the raw material oxide powder, wherein the amount of the above-described raw material oxide powder is not less than about 45% by weight based on the total of the amount of the above-described raw material oxide powder and the oxide-converted amount of the above-described water-soluble compound; the spray-thermal decomposition temperature is set to be not less than the melting point of the glass powder to be manufactured plus about 30° C. when the raw material oxide powder used has an average particle size which is not more than about 1/5 and more than about 1/25 of the average particle size of the glass powder; and the spray-thermal decomposition temperature is set to be not less than the melting point of the glass powder to be manufactured, when the raw material oxide powder for use has an average particle size which is not more than about 1/25 of the average particle size of the glass powder.

Furthermore, the present invention is characterized in that the above-described spray-thermal decomposition method utilizes radiant heat for the heating.

Furthermore, the present invention is characterized in that the above-described water-soluble compound is at least one selected from the group consisting of a chloride, a nitrate, an acetate, a sulfate and a formate.

Furthermore, the present invention is characterized in that the total of the concentration of the above-described raw material oxide powder and the oxide-converted concentration of the above-described water-soluble compound in the above-described mixed solution lies in the range of from about 0.05 to 20% by weight.

Furthermore, the glass powder according to the present invention is a powder of glass particles having a sphericity of not less than about 0.85 which is obtained by thermally treating according to spray-pyrolsis method, a mixed solution of a raw material oxide powder comprising a glass network-forming element, and an aqueous solution of a water-soluble compound comprising a glass-forming element other than the above-described element of the raw material oxide powder, wherein the amount of the above-described raw material oxide powder is less than about 45% by weight based on the total of the amount of the above-described raw material oxide powder and the oxide-converted amount of the above-described water-soluble compound; the spray-thermal decomposition temperature is set to be not less than the melting point of the glass powder to be manufactured plus about 50° C. when the raw material oxide powder used has an average particle size which is not more than about 1/5 and more than about 1/25 of the average particle size of the glass powder; and the spray-thermal decomposition temperature is set to be not less than the melting point of the glass powder to be manufactured plus about 20° C. when the raw material oxide powder used has an average particle size which is not more than about 1/25 of the average particle size of the glass powder.

Furthermore, the glass powder according to the present invention is a powder of glass particles having a sphericity of not less than about 0.85 which is obtained by thermally treating according to spray-pyrolsis method, a mixed solution of a raw material oxide powder comprising a glass network-forming element, and an aqueous solution of a water-soluble compound comprising a glass-forming element other than the above-described element of the raw material oxide powder, wherein the amount of the above-described raw material oxide powder is not less than about 45% by weight based on the total of the amount of the above-described raw material oxide powder and the oxide-converted amount of the above-described water-soluble compound; the spray-thermal decomposition temperature is set to be not less than the melting point of the glass powder to be manufactured plus about 30° C. when the raw material oxide powder used has an average particle size which is not more than about 1/5 and more than about 1/25 of the average particle size of the glass powder; and the spray-thermal decomposition temperature is set to be not less than the melting point of the glass powder to be manufactured, when the raw material oxide powder used has an average particle size which is not more than about 1/25 of the average particle size of the glass powder.

As the glass network-forming element, enumerated are Si, Al, etc. As the raw material oxide powder comprising such an element, a dispersion of a fine powder of silica ($SiO_2$), alumina ($Al_2O_3$), or the like, as well as a dispersion of a superfine powder such as a silica sol or alumina sol can be used as appropriate.

Also, as a method for supplying a mist of the mixed solution into an heated atmosphere of a thermal decomposition furnace or the like so as to subject the mixed solution to a thermal treatment according to the spray-thermal decomposition method, various known pulverizing methods can be applied as appropriate, including an ultrasonic atomizing method, an electrostatic atomizing method and a spray nozzle method.

In general, a powder synthesized according to spray-pyrolsis method tends to form hollow particles, as described in Japanese Unexamined Patent Application Publication No. 8-91874. In particular, when a highly viscous raw material solution is used, the gas generated inside the droplets expands the droplets in the course of the thermal decomposition reaction to leave hollow particles.

As a result of zealous investigations, it was found that hollow particles were hard to generate when the proportion of solid components in the spray-thermal decomposition raw material solution is large. Accordingly, solid particles can be obtained when solid materials are selected as the raw martial compounds comprising network forming elements which occupy a large portion of the glass-forming components.

It was also found that hollow particles are harder to form as the spray-thermal decomposition temperature is set higher than the melting point of the glass to be manufactured. This is because hollow reaction products which are once formed by the thermal decomposition have a low viscosity at a temperature not less than the melting temperature, thus easily emitting the gas entrapped in the cavities inside the reaction products to leave solid particles.

Furthermore, it was possible to completely eliminate the cavities inside the obtained glass particles by restricting the total of the concentration of the raw material oxide powder and the oxide-converted concentration of the water-soluble compound at a level not more than about 20% by weight in the mixed solution. When the concentration exceeded about 20% by weight, the viscosity of the raw material solution was raised, with the result that slightly hollow glass particles were formed. Furthermore, the concentration of the raw material solution greatly affects the sphericity. When the concentration exceeds about 20% by weight, oval-shaped glass particles with a sphericity of less than about 0.85 will be formed.

Furthermore, as the particle sizes of the solid raw materials in the mixed solution are made smaller, the particles become more solid and more spherical. Therefore, for the purpose of obtaining a power of solid spherical glass particles, in addition to the prerequisite that the thermal treatment temperature should be not less than the melting point, it is also required for the temperature to be the higher, the larger are the particle sizes of the raw solid materials.

The smaller the droplets of the atomized mixed solution, the finer the manufactured glass particles can be made. Accordingly, the glass powder manufacturing method according to the present invention does not require a pulverizing step after the glass formation, and therefore contamination of the glass powder by impurities which would be caused during the pulverizing step can be avoided.

DESCRIPTION OF THE PREFERRED EMBODIMENTS

In the following, embodiments according to the present invention will be explained based on the examples. Examples 1 to 5 are for $SiO_2$—$Al_2O_3$—$B_2O_3$—$CaO$ glass powders (melting point of 920° C.). Example 6 is for an $SiO_2$—$Al_2O_3$—$B_2O_3$—$BaO$ glass powder (melting point of 1,030° C.).

EXAMPLE 1

First, amorphous silica (average particle size of 50 nm) which was a raw material oxide powder comprising Si as a glass network-forming element, and aluminum nitrate, boric acid and calcium nitrate which were water-soluble compounds comprising glass-forming elements other than the Si, were prepared as the starting raw materials. The raw materials were each weighed out precisely and put into a beaker at the oxide-converted weight ratio of 42:7:6:45, in the above-described order. Then water was added to make mixed solutions at concentrations of 0.1% and 5% by weight on the oxide-converted basis.

Next, the above-described mixed solutions were atomized with an ultrasonic atomizer and then were sprayed in a mist form into a radiation heating-type vertical spray-thermal decomposition furnace which had been adjusted to a temperature in the range of from 900 to 975° C., at a supplying velocity of 0.1 L/hr to cause a thermal decomposition reaction. The reaction products were then cooled to form glass powders represented by Sample Nos. 1 to 7 in Table 1.

EXAMPLE 2

First, a silica sol (average particle size <5 nm) which was a raw material oxide powder comprising Si as a glass network-forming element, and aluminum nitrate, boric acid and calcium acetate which were water-soluble compounds comprising glass-forming elements other than the Si, were prepared as the starting raw materials. The raw materials were each weighed out precisely and put into a beaker at the oxide-converted weight ratio of 42:7:6:45, in the above-described order. Then water was added to make mixed solutions at concentrations of 0.1% and 5% by weight on the oxide-converted basis.

Next, the above-described mixed solutions were atomized with the ultrasonic atomizer and then were sprayed in a mist form into the radiation heating-type vertical spray-thermal decomposition furnace which had been adjusted to a temperature in the range of from 900 to 975° C., at a supplying velocity of 0.1 L/hr to cause a thermal decomposition reaction. The reaction products were then cooled to form glass powders represented by Sample Nos. 8 to 14 in Table 1.

EXAMPLE 3

Amorphous silica (average particle size of 50 nm) and a powder of fine alumina particles (average particle of 50 nm) which were raw material oxide powders comprising Si and Al as glass network-forming elements, and boric acid and calcium acetate which were water-soluble compounds comprising glass-forming elements other than the Si and Al, were prepared as the starting raw materials. Next, the raw materials were each weighed out precisely and put into a beaker at the oxide-converted weight ratio of 42:7:6:45, in the above-described order. Then water was added to make mixed solutions at concentrations of 0.1% and 5% by weight on the oxide-converted basis.

Next, the above-described mixed solutions were atomized with the ultrasonic atomizer and then were sprayed in a mist form into the radiation heating-type vertical spray-thermal decomposition furnace which had been adjusted to a temperature in the range of from 900 to 975° C., at a supplying velocity of 0.1 L/hr to cause a thermal decomposition reaction. The reaction products were then cooled to form glass powders represented by Sample Nos. 15 to 21.

EXAMPLE 4

A silica sol (particle size <5 nm) and alumina sol (particle size <5 nm) which were raw material oxide powders comprising Si and Al as glass network-forming elements, and boric acid and calcium nitrate which were water-soluble compounds comprising glass-forming elements other than the Si and Al, were prepared as the starting raw materials. The raw materials were each weighed out precisely and put into a beaker at the oxide-converted weight ratio of 42:7:6:45, in the above-described order. Then water was added to make mixed solutions at concentrations of from 0.1% to 30% by weight on the oxide-converted basis.

Next, the above-described mixed solutions were atomized with the ultrasonic atomizer and then were sprayed in a mist form into the radiation heating-type vertical spray-thermal decomposition furnace which had been adjusted to a temperature in the range of from 900 to 975° C., at a supplying velocity of 0.1 L/hr to cause a thermal decomposition reaction. The reaction products were then cooled to form glass powders represented by Sample Nos. 22 to 32.

EXAMPLE 5

A silica sol (particle size <5 nm) and alumina sol (particle size <5 nm) which were raw material oxide powders comprising Si and Al as glass network-forming elements, and boric acid and calcium nitrate which were water-soluble compounds comprising glass-forming elements other than the Si and Al, were prepared as the starting raw materials. Next, the raw materials were each weighed out precisely and put into a beaker at the oxide-converted weight ratio of 42:7:6:45, in the above-described order. Then water was added to make mixed solutions at concentrations of from 5% to 30% by weight on the oxide-converted basis.

Next, the above-described mixed solutions were atomized with a two-fluid nozzle and then were sprayed in a mist form into the radiation heating-type vertical spray-thermal decomposition furnace which had been adjusted to a temperature of 1,000° C., at a supplying velocity of 0.5 L/hr to cause a thermal decomposition reaction. The reaction products were then cooled to form glass powders represented by Sample Nos. 33 to 36.

EXAMPLE 6

A silica sol (particle size <5 nm) and alumina sol (particle size <5 nm) which were raw material oxide powders comprising Si and Al as glass network-forming elements, and boric acid and barium nitrate which were water-soluble compounds comprising glass-forming elements other than the Si and Al, were prepared as the starting raw materials. Next, the raw materials were each weighed out precisely and put into a beaker at the oxide-converted weight ratio of 49:11:15:25, in the above-described order. Then water was added to make precursor solutions at a concentration of 5% by weight on the oxide-converted basis.

Next, the precursor solutions were atomized with the two-fluid nozzle and then were sprayed in a mist form into the radiation heating-type vertical spray-thermal decomposition furnace which had been adjusted to a temperature in the range of from 1,000 to 1,100° C., at a supplying velocity of 0.5 L/hr to cause a thermal decomposition reaction. The reaction products were then cooled to form glass powders represented by Sample Nos. 37 to 39.

The above-described glass powders obtained in Examples 1 to 6 were subjected to photography under a scanning electron microscope (SEM) to determine the particle sizes.

The pictures taken under the scanning electron microscope (SEM) were also subjected to image analysis to determine the sphericities of the glass particles according to the equation (1) described below. In equation (1), the sphericity (R) is 1 when a particle is a perfect sphere, and as the shape of a particle becomes deviated from a perfect sphere, coming nearer, for example, to an oval, the value of R becomes smaller than 1.

$$\text{Sphericity } (R) = 4\pi S/L^2 \qquad \text{Equation (1)},$$

wherein S: area of the image of the glass particle

L: circumferential length of the image of the glass particle

Furthermore, generation of glasses was confirmed by an X-ray diffraction method (XRD).

The cross-sections of the glass powders were also subjected to scanning electron microscopic (SEM) observation. Particles in which no hollow parts were observed were determined as "solid", and those in which hollow parts were observed were determined as "hollow".

The results are shown in Table 1. In Table 1, "partially hollow" means that most particles of a powder were solid but there were also some of them which were "hollow", in the scanning electron microscopic (SEM) observation.

Furthermore, when the spray-thermal decomposition temperature is not less than the melting point of the glass powder to be manufactured and less than the melting point plus about 50° C., only partially hollow glass particles can

TABLE 1

|  | Sample No. | Concentration (wt. %) | Thermal decomposition temperature (° C.) | Particle size (μm) | Sphericity | XRD | Shape of particles |
|---|---|---|---|---|---|---|---|
| Example 1 | 1 | 5 | 900 | 0.54 | 0.91 | Partially crystallized | Partially hollow |
|  | 2 | 0.1 | 925 | 0.15 | 0.95 | Amorphous | Partially hollow |
|  | 3 | 5 | 925 | 0.55 | 0.91 | Amorphous | Partially hollow |
|  | 4 | 0.1 | 950 | 0.15 | 0.92 | Amorphous | Partially hollow |
|  | 5 | 5 | 950 | 0.55 | 0.90 | Amorphous | Partially hollow |
|  | 6 | 0.1 | 975 | 0.15 | 0.91 | Amorphous | Partially hollow |
|  | 7 | 5 | 975 | 0.52 | 0.95 | Amorphous | Solid and spherical |
| Example 2 | 8 | 5 | 900 | 0.53 | 0.92 | Partially crystallized | Partially hollow |
|  | 9 | 0.1 | 925 | 0.14 | 0.91 | Amorphous | Partially hollow |
|  | 10 | 5 | 925 | 0.52 | 0.92 | Amorphous | Partially hollow |
|  | 11 | 0.1 | 950 | 0.14 | 0.94 | Amorphous | Solid and spherical |
|  | 12 | 5 | 950 | 0.50 | 0.95 | Amorphous | Solid and spherical |
|  | 13 | 0.1 | 975 | 0.14 | 0.95 | Amorphous | Solid and spherical |
|  | 14 | 5 | 975 | 0.50 | 0.95 | Amorphous | Solid and spherical |
| Example 3 | 15 | 5 | 900 | 0.55 | 0.89 | Partially crystallized | Partially hollow |
|  | 16 | 0.1 | 925 | 0.15 | 0.91 | Amorphous | Partially hollow |
|  | 17 | 5 | 925 | 0.55 | 0.90 | Amorphous | Partially hollow |
|  | 18 | 0.1 | 950 | 0.15 | 0.91 | Amorphous | Partially hollow |
|  | 19 | 5 | 950 | 0.51 | 0.94 | Amorphous | Solid and spherical |
|  | 20 | 0.1 | 975 | 0.14 | 0.92 | Amorphous | Partially hollow |
|  | 21 | 5 | 975 | 0.51 | 0.95 | Amorphous | Solid and spherical |
| Example 4 | 22 | 5 | 900 | 0.54 | 0.95 | Partially crystallized | Partially hollow |
|  | 23 | 0.1 | 925 | 0.14 | 0.95 | Amorphous | Solid and spherical |
|  | 24 | 5 | 925 | 0.51 | 0.95 | Amorphous | Solid and spherical |
|  | 25 | 0.1 | 950 | 0.14 | 0.94 | Amorphous | Solid and spherical |
|  | 26 | 5 | 950 | 0.51 | 0.95 | Amorphous | Solid and spherical |
|  | 27 | 0.1 | 975 | 0.14 | 0.95 | Amorphous | Solid and spherical |
|  | 28 | 0.5 | 975 | 0.24 | 0.94 | Amorphous | Solid and spherical |
|  | 29 | 5 | 975 | 0.51 | 0.94 | Amorphous | Solid and spherical |
|  | 30 | 10 | 975 | 0.64 | 0.92 | Amorphous | Solid and spherical |
|  | 31 | 20 | 975 | 0.81 | 0.87 | Amorphous | Solid and spherical |
|  | 32 | 30 | 975 | — | — | — | — |
| Example 5 | 33 | 5 | 1,000 | 1.28 | 0.94 | Amorphous | Solid and spherical |
|  | 34 | 10 | 1,000 | 1.61 | 0.93 | Amorphous | Solid and spherical |
|  | 35 | 20 | 1,000 | 2.03 | 0.85 | Amorphous | Solid and spherical |
|  | 36 | 30 | 1,000 | 2.51 | 0.80 | Amorphous | Solid and oval-shaped |
| Example 6 | 37 | 5 | 1,000 | 2.84 | 0.87 | Partially crystallized | Partially hollow |
|  | 38 | 5 | 1,050 | 1.86 | 0.93 | Amorphous | Solid and spherical |
|  | 39 | 5 | 1,100 | 1.53 | 0.95 | Amorphous | Solid and spherical |

Examples 1 and 2 are those of the manufacturing method for a glass powder according to spray-pyrolsis method wherein the rates of the above-described raw material oxide powers are each less than about 45% by weight of the totals of the amounts of the raw material oxide powders comprising glass network-forming elements and the oxide-converted amounts of the water-soluble compounds comprising glass-forming elements other than the above-described elements of the raw material oxide powders.

When the average particle size of a raw material oxide powder used is not more than ⅕ and more than ¹⁄₂₅ of the average particle size of the glass powder to be manufactured, a powder of solid and spherical (sphericity of 0.85 or more) glass particles can be obtained by selecting spray-pyrolsis temperature which is not less than the melting point of the glass powder plus about 50° C., as shown in Sample No. 7.

In comparison, when the spray-thermal decomposition temperature is lower than the melting point of the glass powder to be manufactured, the desired glass powder cannot be obtained as evidenced by a slight crystallization peak detected by the X-ray diffraction as shown in Sample No. 1.

be obtained as shown in Sample Nos. 3 and 5, even if the average particle size of a raw material oxide powder used is not more than about ⅕ and more than about ¹⁄₂₅ of the average particle size of the glass powder to be manufactured. Also, when the average particle size of a raw material oxide powder used is more than about ⅕ of the average particle size of the glass powder to be manufactured, only partially hollow glass particles can be obtained as shown in Sample No. 6, even if the spray-thermal decomposition temperature is not less than the melting point of the glass powder plus about 50° C.

When the average particle size of a raw material oxide powder used is not more than about ¹⁄₂₅ of the average particle size of the glass powder to be manufactured, a powder of solid and spherical (sphericity of 0.85 or more) glass particles can be obtained by selecting spray-pyrolsis temperature which is not less than the melting point of the glass powder plus about 20° C., as shown in Sample Nos. 11 through to 14.

In comparison, when the spray-thermal decomposition temperature is lower than the melting point of the glass powder, the desired glass powder cannot be obtained as evidenced by a slight crystallization peak detected by the X-ray diffraction as shown in Sample No. 8. Furthermore, when the spray-thermal decomposition temperature is not less than the melting point of the glass powder to be manufactured and less than the melting point plus about 20° C., only partially hollow glass particles can be obtained as shown in Sample Nos. 9 and 10, even if the average particle size of a raw material oxide powder used is not more than about ½s of the average particle size of the glass powder to be manufactured.

Examples 3 through to 6 are those of the manufacturing method for a glass powder according to spray-pyrolsis method wherein the rates of the above-described raw material oxide powers are each not less than about 45% by weight of the totals of the amounts of the raw material oxide powders comprising glass network-forming elements and the oxide-converted amounts of the water-soluble compounds comprising glass-forming elements other than the above-described elements of the raw material oxide powders.

When the average particle size of a raw material oxide powder used is not more than about ⅕ and more than about ½s of the average particle size of the glass powder to be manufactured, a powder of solid and spherical (sphericity of 0.85 or more) glass particles can be obtained by selecting spray-pyrolsis temperature which is not less than the melting point of the glass powder plus about 30° C., as shown in Sample Nos. 19 and 21.

In comparison, when the spray-thermal decomposition temperature is lower than the melting point of the glass powder to be manufactured, the desired glass powder cannot be obtained as evidenced by a slight crystallization peak detected by the X-ray diffraction as shown in Sample No. 15. Furthermore, when the spray-thermal decomposition temperature is not less than the melting point of the glass powder to be manufactured and less than the melting point plus about 30° C., only partially hollow glass particles can be obtained as shown in Sample No. 17, even if the average particle size of a raw material oxide powder used is not more than about ⅕ and more than about ½s of the average particle size of the glass powder. Also, when the average particle size of a raw material oxide powder used is more than ⅕ of the average particle size of the glass powder to be manufactured, only partially hollow glass particles can be obtained as shown in Sample No. 18, even if the spray-thermal decomposition temperature is not less than the melting point of the glass powder plus about 30° C.

Also, when the average particle size of a raw material oxide powder used is not more than ½s of the average particle size of the glass powder to be manufactured, a powder of solid and spherical (sphericity of 0.85 or more) glass particles can be obtained by selecting spray-pyrolsis temperature which is not less than the melting point of the glass powder, as shown in Sample Nos. 23 through to 31, 33 through to 35, 38 and 39.

In comparison, when the spray-thermal decomposition temperature is lower than the melting point of the glass powder to be manufactured, the desired glass powder cannot be obtained as evidenced by a slight crystallization peak detected by the X-ray diffraction as shown in Sample Nos. 22 and 37. Furthermore, when the total of the concentration of the raw material oxide powder and the oxide-converted concentration of the water-soluble compound exceeds about 20% by weight in the mixed solution, the solution becomes too viscous to form droplets with the ultrasonic atomizer, and therefore a glass powder cannot be manufactured as shown in Sample No. 32. Even when a glass powder is formed, the sphericity of the glass particles is poor as shown in Sample No. 36.

As is evident from the above-described explanations, a powder of solid spherical glass particles with a sphericity of not less than 0.85 can be manufactured easily by the manufacturing method according to the present invention.

What is claimed is:

1. A method for manufacturing a solid glass powder having a desired average particle size which comprises providing a mixed solution comprising (a) a raw material oxide powder comprising a glass network-forming element, said raw material powder having an average particle size which is not more than about ⅕ of said average particle size of said glass powder, and (b) an aqueous solution of a water-soluble compound comprising a different glass-forming element; identifying the amount of said raw material oxide powder based on the total of the amount of said raw material oxide powder and the amount of said water-soluble compound calculated as an oxide (oxide-converted), the melting point of said glass powder and the average particle size of the raw material oxide powder; and spray-thermal decomposing the mixed solution by application of radiant heat at a decomposition temperature which is:

when the amount of said raw material oxide powder is less than about 45% by weight based on the total of the amount of said raw material oxide powder and the amount of said water-soluble compound calculated as an oxide (oxide-converted), and the average particle size of said glass powder is more than about ½s of the average particle size of said solid glass powder, the spray-thermal decomposition temperature is not less than the melting point of said glass powder plus about 50° C.;

when the amount of said raw material oxide powder is less than about 45% by weight based on the total of the amount of said raw material oxide powder and the amount of said water-soluble compound calculated as an oxide (oxide-converted) and the average particle size of said glass powder is not more than about ½s of the average particle size of said solid glass powder, the spray-thermal decomposition temperature is not less than the melting point of said glass powder plus about 20° C.;

when the amount of said raw material oxide powder is more than about 45% by weight based on the total of the amount of said raw material oxide powder and the oxide-converted amount of said water-soluble compound, and the raw material oxide powder has an average particle size which is more than about ½s of the average particle size of said glass powder, the spray-thermal decomposition temperature is not less than the melting point of said glass powder plus about 30° C.; and when the amount of said raw material oxide powder is more than about 45% by weight based on the total of the amount of said raw material oxide powder and the oxide-converted amount of said water-soluble compound, and the raw material oxide powder has an average particle size which is not more than about ½s of the average particle size of said glass powder, the spray-thermal decomposition temperature is not less than the melting point of said glass powder.

2. A method for manufacturing a solid glass powder according to claim 1, wherein said water-soluble compound is at least one member selected from the group consisting of chloride, nitrate, acetate, sulfate and formate.

3. A method for manufacturing a solid glass powder according to claim 2, wherein the total of the concentration of said raw material oxide powder and the oxide-converted concentration of said water-soluble compound is about 0.05% to 20% by weight of said mixed solution.

4. A method for manufacturing a solid glass powder according to claim 3, wherein said water-soluble compound is a nitrate or acetate of barium or calcium, and said raw material powder comprises Si or Al.

5. A method for manufacturing a solid glass powder according to claim 4, wherein the amount of said raw material oxide powder is less than about 45% by weight based on the total of the amount of said raw material oxide powder and the oxide-converted amount of said water-soluble compound, and the raw material oxide powder has an average particle size which is more than about 1/25 of the average particle size of said glass powder.

6. A method for manufacturing a solid glass powder according to claim 4, wherein the amount of said raw material oxide powder is less than about 45% by weight based on the total of the amount of said raw material oxide powder and the oxide-converted amount of said water-soluble compound, and the raw material oxide powder has an average particle size which is less than about 1/25 of the average particle size of said glass powder.

7. A method for manufacturing a solid glass powder according to claim 4, wherein the amount of said raw material oxide powder is more than about 45% by weight based on the total of the amount of said raw material oxide powder and the oxide-converted amount of said water-soluble compound, and the raw material oxide powder has an average particle size which is more than about 1/25 of the average particle size of said glass powder.

8. A method for manufacturing a solid glass powder according to claim 4, wherein the amount of said raw material oxide powder is more than about 45% by weight based on the total of the amount of said raw material oxide powder and the oxide-converted amount of said water-soluble compound, and the raw material oxide powder has an average particle size which is less than about 1/25 of the average particle size of said glass powder.

9. A method for manufacturing a solid glass powder according to claim 1, wherein the amount of said raw material oxide powder is less than about 45% by weight based on the total of the amount of said raw material oxide powder and the oxide-converted amount of said water-soluble compound, and the raw material oxide powder has an average particle size which is more than about 1/25 of the average particle size of said glass powder.

10. A method for manufacturing a solid glass powder according to claim 1, wherein the amount of said raw material oxide powder is less than about 45% by weight based on the total of the amount of said raw material oxide powder and the oxide-converted amount of said water-soluble compound, and the raw material oxide powder has an average particle size which is less than about 1/25 of the average particle size of said glass powder.

11. A method for manufacturing a solid glass powder according to claim 1, wherein the amount of said raw material oxide powder is more than about 45% by weight based on the total of the amount of said raw material oxide powder and the oxide-converted amount of said water-soluble compound, and the raw material oxide powder has an average particle size which is more than about 1/25 of the average particle size of said glass powder.

12. A method for manufacturing a solid glass powder according to claim 1, wherein the amount of said raw material oxide powder is more than about 45% by weight based on the total of the amount of said raw material oxide powder and the oxide-converted amount of said water-soluble compound, and the raw material oxide powder has an average particle size which is less than about 1/25 of the average particle size of said glass powder.

\* \* \* \* \*